United States Patent [19]
Veber et al.

[11] 3,891,692
[45] June 24, 1975

[54] N-(CYCLOPROPYLALKOXYCARBONYL-)AMINO ACIDS

[75] Inventors: Daniel F. Veber; Stephen F. Brady, both of Westfield, N.J.

[73] Assignee: Merck & Co., Inc., Rahway, N.J.

[22] Filed: May 3, 1972

[21] Appl. No.: 249,975

[52] U.S. Cl...... 260/471 C; 260/112.5; 260/293.65; 260/293.71; 260/293.74; 260/326.4; 260/481 C; 260/482 C
[51] Int. Cl............................................ C07c 125/06
[58] Field of Search........ 260/471 A, 482 C, 471 C, 260/112.5 US, 519, 534 R, 534 C, 534 G

[56] References Cited
UNITED STATES PATENTS

| | | | |
|---|---|---|---|
| 2,261,169 | 11/1941 | Lott | 260/482 C |
| 2,713,575 | 7/1955 | Gates et al. | 260/117 |
| 2,954,396 | 9/1960 | Ayers et al. | 260/482 |
| 3,062,805 | 11/1962 | Albertson et al. | 260/112 |

OTHER PUBLICATIONS

McKay et al., J. Am. Chem. Soc., 79, (1957), pp. 4686 – 4690.

*Primary Examiner*—Lorraine A. Weinberger
*Assistant Examiner*—Michael Shippen
*Attorney, Agent, or Firm*—J. Jerome Behan; Henry H. Bassford, Jr.

[57] ABSTRACT

Novel N-protected-α-amino acid compounds are disclosed in which the amino functionality is protected by a cyclopropylmethoxycarbonyl or 1-cyclopropylethoxycarbonyl. Processes for the synthesis of amino acids containing these protecting groups and the use of these novel amino acid compounds in the preparation of peptides are also disclosed.

3 Claims, No Drawings

N-(CYCLOPROPYLALKOXYCARBONYL)AMINO ACIDS

The present invention relates to novel N-protected-α-amino acid compounds. More particularly, this invention relates to novel protected amino acid compounds in which the amino functionality is protected with cyclopropylmethoxycarbonyl or 1-cyclopropylethoxycarbonyl radicals and the use of these compounds in peptide synthesis.

A major object of present day research in peptide and protein chemistry is the development of new and superior methods of peptide synthesis. The fundamental peptide forming reaction involves coupling of two or more amino acids in a manner to form an amide linkage between the molecules. Since amino acids are at least bifunctional, it is necessary to render inactive all functionalities in a given amino acid which are not directly employed in the coupling reaction. Failure to block or protect the reactive functionalities will result in formation of a large amount of undesirable by-products which will lower yields and make purification more difficult. There are several well known methods for rendering inactive the amino functionality of amino acids with protecting groups in such a manner that only the carboxy functionality is available to react in forming the amide linkage. It is necessary for the protecting group to be readily attached to the amino acid before amide formation, to be stable to the reaction conditions employed in formation and purification of the peptide and to be readily removed from the resulting peptide, after coupling, without simultaneous rupture of the newly formed peptide linkage. These requirements are met by the cyclopropylmethoxycarbonyl and 1-cyclopropylethoxycarbonyl groups of this invention. The N-protected-α-amino acid compounds of this invention and the methods of peptide synthesis employing these compounds represent an advance in peptide synthesis by improving yields and eliminating by-product formation.

One of the most commonly employed protecting groups of the amino functionality of α-amino acids in peptide synthesis is the tert-butyloxycarbonyl (t-Boc) blocking group. This blocking group has found wide use in peptide chemistry because it is readily attached to the amino functionality of amino acids and the cleavage of the t-Boc group occurs upon relatively short action of acids. In spite of the wide applicability of the t-Boc group, certain problems have arisen associated with the use of this blocking group in peptide synthesis. One problem is concerned with the partial loss of t-Boc during isolation procedures using 50% aqueous acetic acid, a solvent employed in purification of peptides by gel filtration. It has been found that the cyclopropylmethoxycarbonyl blocking group is more stable than the t-Boc group in 50% aqueous acetic acid and yet it is sufficiently labile under acidic conditions to be useful in peptide synthesis. The advantage of the cyclopropylmethoxycarbonyl protecting group is that it facilitates manipulation of protected peptides over a longer period of time under conditions where loss of t-Boc has been observed.

In synthesizing large peptides, it is common to employ both the tert-butyloxycarbonyl (t-Boc) and the carbobenzoxycarbonyl (Cbz) as blocking groups for the amino functionality of various amino acid residues in the peptide chain. Attempts to selectively remove the t-Boc group in the presence of the Cbz group under acid conditions, for example trifluoroacetic acid, anhydrous hydrofluoric acid, hydrogen chloride in ethyl acetate, results in partial loss of the Cbz group along with cleavage of the t-Boc group. The 1-cyclopropylethoxycarbonyl blocking group is less stable than the t-Boc protecting group under acid conditions. The more labile 1-cyclopropylethoxycarbonyl group is useful in situations involving its removal in the presence of the Cbz protecting group elsewhere in the molecule.

The novel blocking groups of the present invention, namely cyclopropylmethoxycarbonyl or 1-cyclopropylethoxycarbonyl, can be employed in all cases where the t-Boc protecting group is employed in the synthesis of peptides.

The novel N-protected-α-amino acids of this invention may be illustrated by the following formula:

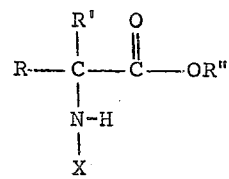

wherein X is a monovalent protective radical selected from the group consisting of cyclopropylmethoxycarbonyl and 1-cyclopropylethoxycarbonyl, R and R' represent the residue of an α-amino acid, and R" represents hydrogen, loweralkyl radical straight or branched chain having from 1–6 carbon atoms, for example, methyl, ethyl, n-propyl, isopropyl, butyl, t-butyl, aralkyl for example benzyl, phenylethyl, aryl, for example phenyl, p-nitrophenyl, heterocyclic, for example N-succinimide, N-piperidyl, and the like.

The starting materials in preparing the novel N-protected amino compounds of the present invention are the naturally occurring α-amino acids and include the following: glycine, alanine, valine, leucine, isoleucine, phenylalanine, tyrosine, proline, hydroxyproline, serine, threonine, cysteine, cystine, methionine, aspartic acid, glutamic acid, arginine, lysine, ornithine, histidine, and the like.

The novel N-protected-α-amino acid compounds of this invention are conveniently prepared by reacting cyclopropylcarbinylchloroformate or 1-cyclopropylethylchloroformate with an appropriate α-amino acid or ester thereof.

Formation of the chloroformate compounds can be accomplished by reacting the starting alcohol, cyclopropylcarbinol or methylcyclopropylcarbinyl alcohol with phosgene in an organic solvent. The reaction is run by adding a solution of the alcohol in an organic solvent such as benzene, ether, methylene chloride, and the like, to a solution of phosgene in the same solvent. An excess of phosgene, generally from 2–5 moles of phosgene per mole of alcohol is employed in preparing the chloroformate compound. The alcohol solution is added slowly to the phosgene solution at low temperatures of from −30°C. to 25°C. and preferably about 0°C. The reaction proceeds to completion by stirring at 0°C. Formation of the chloroformate compound is accompanied by the generation of hydrogen chloride and an acid acceptor, for example an organic amine compound can be employed to remove the gas from the reaction medium by precipitating out as the hydrochloride salt. Organic amines which are useful in this step of the reaction include pyridine, triethylamine, N-methylmorpholine, and the like. The amine hydrochloride salt is removed from the reaction mixture by filtration and the excess phosgene is removed by evacuatitng under aspirator pressure. Removal of the solvent in vacuo affords the cyclopropylcarbinylchloroformate or the corresponding 1-cyclopropylethylchloroformate. The chloroformate compounds tend to be unstable and should be employed immediately or maintained at a temperature of about 0°C. Due to the instability of the chloroformate compounds, it is preferable to employ these compounds as a solution in the solvent in which it was prepared.

Formation of the N-protected amino acid compounds of this invention is carried out by treating approximately equimolar quantities of the chloroformate reagent and an α-amino acid or ester thereof in an appropriate solvent at reduced temperatures in a basic medium for a period of time ranging from several minutes to several hours for the reaction to proceed to substantial completion as determined by thin layer chromatography.

The reaction of the α-amino acid with the chloroformate reagent is carried out in a basic aqueous solution. The reaction of an α-amino acid ester, such as a lower-alkyl ester, for example, the methyl, ethyl, n-propyl, isopropyl, t-butyl esters and the like, is carried out in an organic solvent. Appropriate solvents are for example chloroform, tetrahydrofuran, dimethylformamide, acetonitrile, isopropanol, and the like. Preferably, the chloroformate is added portion-wise to the amino acid dissolved or suspended in the solvent. The reaction is run in a basic medium generally at a pH of from 7 to 13, and preferably pH 9. A base, for example sodium hydroxide or an organic amine such as triethylamine, N-methylmorpholine, or diisopropylethylamine is added to the amino acid to adjust the pH to 9. During the addition of the chloroformate component, base is added to maintain the pH within the required range. In general, the temperature at which the reaction is carried out ranges from about 0°C to 25°C. Addition of the chloroformate compound is preferably conducted at about 0°C. and the reaction is then allowed to proceed to completion at ambient temperature. Upon completion of the reaction, the N-protected-α-amine acid product is separated by conventional means such as extraction. If the product is in the form of its loweralkyl ester, saponification to the free acid is accomplished by treating an aqueous alcoholic solution with base, for example sodium hydroxide, and allowing the reaction to run to completion at room temperature. Acidification of the reaction mixture with mineral acid, for example sulfuric acid, hydrochloric acid, and removal of the solvent affords the N-protected-α-amino acid by methods known in the art.

The novel blocking groups of this invention can be completely removed from an amino acid or peptide containing said blocking group by treatment with acid. Cleavage of the 1-cyclopropylethoxyoxycarbonyl group can be carried out in the presence of anhydrous hydrofluoric acid, trifluoroacetic acid, formic acid, anhydrous hydrogen chloride, in an organic solvent, such as ethyl acetate, acetic acid, dioxane, and the like. The cleavage with anhydrous hydrofluoric acid is carried out by treating the blocked amino acid or peptide at −40° to +20°C. and preferably at 0°C. for 1 hour. The reaction with trifluoroacetic acid is carried out by treating the protected amino acid or peptide at 25°C. for 5 minutes. Removal of the cyclopropylmethoxycarbonyl group with trifluoroacetic acid can be carried out by treating the blocked amino acid or peptide at 25°C. for 5 hours. The total absence of the blocking group is determined by thin layer chromatography.

Another aspect of the present invention relates to "active esters" of novel N-protected-α-amino acid compounds of this invention and the use of these esters in the synthesis of peptides. According to this feature, a reactive ester, for example N-hydroxysuccinimide, 1-piperidyl, and p-nitrophenyl esters of N-protected-α-amino acids, are reacted with a derivative of an α-amino acid or derivative of a peptide to afford a higher peptide.

The novel esters of this invention may be prepared by reacting N-hydroxysuccinimide, 1-hydroxypiperidine, or p-nitrophenol with an N-protected-α-amino acid in a suitable solvent such as dioxane in the presence of N,N'-dicyclohexylcarbodiimide. The reaction is carried out by dissolving approximately equimolar quantities of N-hydroxysuccinimide, 1-hydroxypiperidine, or p-nitrophenol and N-protected-α-amino acid in an appropriate solvent preferably a non-aqueous solvent at room temperature or below, then dissolving approximately a 10% excess of an equimolar quantity of N,N'-dicyclohexylcarbodiimide in this solution while maintaining the reduced temperature and then maintaining the resulting solution at reduced temperature for a period of time ranging from an hour to several days for the reaction to proceed to substantial completion. Appropriate solvents are, for example dioxane, tetrahydrofuran, dimethylformamide, and the like. In general, the temperature at which the reaction is carried out ranges from about −10°C. to about 25°C. After the reaction has proceeded to substantial completion, any by-products such as N,N'-dicyclohexylurea may be separated from the desired ester product by conventional means, for example filtration.

The novel N-protected-α-amino acid compounds of this invention are useful in peptide synthesis. For preparing peptides according to the present invention, the condensation methods usual in peptide chemistry may be used, such as the carbodiimide or the azide method, or, for example, the mixed anhydrides or activated esters. The peptides are built up from amino acids by condensing members selected from the group consisting of naturally occurring α-amino acids, peptides built up from said amino acids, and derivatives thereof, and wherein as least one component of said members has the α-amino functionality protected with a cyclopropylmethoxycarbonyl or 1-cyclopropylethoxycarbonyl blocking group.

In preparing peptides with the novel N-protected-α-amino acid compounds of this invention, other functional groups of the amino acids, for example, —OH, —SH, —COOH, and other —NH$_2$ groups may or must be protected by methods generally employed in peptide chemistry (see E. Schroder and K. Lubke, the Peptides, Academic Press, Inc., New York and London, 1965, vol. I, pages 3–75). Amino groups can be protected by acyl-type protecting groups, for example formyl, acetyl, chloroacetyl, trichloroacetyl, trifluoroacetyl, benzoyl, phthalyl, phenacetyl blocking groups and the like; urethan protecting groups, such as carbobenzoxy, substituted carbobenzoxy, tert-butyloxycarbonyl, alkyl-type protecting groups, such as trityl, benzyl, dibenzyl, and the like. Carboxyl groups can be protected by esters; alkyl esters, for example, methyl, ethyl, tert-butyl, benzyl and substituted benzyl groups. Sulfhydryl groups can be protected by trityl, benzhydryl, or acetamidomethyl groups. The hydroxyl groups can be protected by trityl, benzyl, or tert-butyl groups.

An example of the use of the novel N-protected-α-amino acid compounds of this invention in peptide synthesis is the preparation of α-aspartyl-phenylalanine methyl ester, a known sweetening agent. The dipeptide is conveniently prepared by coupling N-(1-cyclopropylethoxycarbonyl) aspartic anhydride with phenylalanine methyl ester hydrochloride. Introduction of the 1-cyclopropylethoxycarbonyl blocking group into aspartic acid is accomplished by reacting 1-cyclopropylethyl chloroformate with aspartic acid dimethyl ester in accordance with the process of this invention. Equimolar quantities of the chloroformate and aspartic acid dimethyl ester are reacted in chloroform at 0°C. at pH 8. Reaction is carried out by portion-wise addition of 1-cyclopropylethyl chloroformate to the aspartic acid dimethyl ester suspended in chloroform. Triethylamine is added to the reaction during the addition to maintain pH 8. After allowing the reaction to run to completion at room temperature, the reaction mixture is treated according to the procedure outlined above to afford the N-(1-cyclopropylethoxycarbonyl) aspartic acid dimethyl ester. The free acid is obtained by saponifying the ester in a basic aqueous methanol solution. After acidifying the reaction mixture with sulfuric acid, the N-(1-cyclopropylethoxycarbonyl) aspartic acid is isolated by extraction.

N-(1-cyclopropylethoxycarbonyl) aspartic anhydride is prepared by treating the N-protected aspartic acid with dicyclohexylcarbodiimide in dioxane. After the reaction is completed, the dicyclohexyl urea is removed by filtration and evaporation of the solvent affords N-(1-cyclopropylethoxycarbonyl) aspartic anhydride.

Coupling of N-(1-cyclopropylethoxycarbonyl) aspartic anhydride with phenylalanine methyl ester hydrochloride is carried out in an organic solvent, for example dimethylformamide in the presence of an amine such as triethylamine. The reaction is stirred for several hours at a temperature of about 20°C. Upon completion of the coupling reaction the solvent is removed and the residue dissolved in ethyl acetate. Extraction with acid and removal of the solvent affords a mixture of α and β N-(1-cyclopropylethoxycarbonyl) aspartyl-phenylalanine methyl ester. The blocking group is removed by stirring the protected dipeptide ester in anhydrous hydrofluoric acid at 0°C. The α-isomer of aspartyl-phenylalanine methyl ester is isolated by treating an aqueous mixture of the α-and β-isomers with β-phenylpropionic acid at a pH of from 3–5. The α-aspartyl phenylalanine methyl ester β-phenylpropionic adduct precipitates out of the solution. The resulting adduct is readily decomposed by treatment with acid to produce α-aspartyl phenylalanine methyl ester.

The following examples are given for purposes of illustration and should not be considered limitations of this invention, many apparent variations of which are possible without departing from the spirit or scope thereof. The α-amino acids used in the examples are in the L-configuration. The process is equally applicable to D-α-amino acids and to racemic mixtures.

EXAMPLE 1

N-(Cyclopropylmethoxycarbonyl)-Phenylalanine

A. Preparation of Cyclopropylcarbinyl Chloroformate

A solution of 1.57 ml. (1.44 gm., 20 mM) of cyclopropylcarbinol in 10 ml. of dry ether is treated with 40 mM of phosgene at 0°C. After the reaction is complete, the phosgene is allowed to evaporate at room temperature by passing a stream of nitrogen through the reaction. Residual phosgene and ether is removed by evacuating the reaction and 2.37 gm. of a colorless liquid of cyclopropylcarbinyl chloroformate is obtained. The infrared spectra of this compound indicates the absence of hydroxyl absorption and a strong carbonyl absorption at 1740 $cm^{-1}$.

B. N-(Cyclopropylmethoxycarbonyl)-Phenylalanine

A solution of 1.34 gm. (8.0 mM) of L-phenylalanine in 40 ml. of 1.0 M sodium bicarbonate is prepared and 1.3 mM cyclopropylcarbinyl chloroformate is added in portions with vigorous stirring over 2½ hours. When the reaction is completed, the pH of the reaction mixture is adjusted to 3 by the addition of 2.5 N hydrochloric acid, and the solid formed is isolated by filtration, washed with water, and dried in vacuo. The solid material is dissolved in benzene and hexane is added until cloudiness appears. On standing, N-(cyclopropylmethoxy-carbonyl) phenylalanine precipitates out, m.p. 105°–107°C.

When in the above procedure glycine methyl ester hydrochloride, alanine methyl ester hydrochloride, valine methyl ester hydrochloride, leucine methyl ester hydrochloride, methionine methyl ester hydrochloride, serine methyl ester hydrochloride, proline methyl ester hydrochloride, tyrosine methyl ester hydrochloride, and isoleucine methyl ester hydrochloride are used in place of phenylalanine methyl ester hydrochloride, there are obtained N-(cyclopropylmethoxycarbonyl)-glycine, N-(cyclopropylmethoxycarbonyl-alanine, N-(cyclopropylmethoxycarbonyl)-valine, N-(cyclopropylmethoxycarbonyl)-leucine, N-(cyclopropylmethoxycarbonyl)-methionine, N-(cyclopropylmethoxycarbonyl)-serine, N-(cyclopropylmethoxycarbonyl)-proline, N-(cyclopropylmethoxycarbonyl)-tyrosine, and N-(cyclopropylmethoxycarbonyl)-isoleucine, respectively.

EXAMPLE 2

N-(Cyclopropylmethoxycarbonyl)-Phenylalanine-Alanine Methyl Ester

To a solution of 0.52 mM of N-(cyclopropylmethoxycarbonyl)-phenylalanine in 4 ml. acetonitrile is added 0.60 mM alanine methyl ester hydrochloride and 80 microliters of triethylamine. Immediately following addition of the triethylamine, a solution of 119 mg. 0.58 mM, of N,N'-dicyclohexylcarbodiimide in 2 ml. of acetonitrile is added and the reaction is allowed to stir overnight at 20°–25°C. Excess N,N'-dicyclohexylcarbodiimide is destroyed by addition of 5 drops of 50% acetic acid. After adding 15 ml. of methylene chloride, the reaction mixture is filtered to remove the dicyclohexylurea formed during the reaction and the filtrate is treated in the following manner: wash with saturated sodium bicarbonate, 50% saturated sodium chloride solution, 0.2 N sulfuric acid saturated with sodium sulfate, twice with 50% saturated sodium chloride solution. Repeat washing cycle with two portions of methylene chloride and dry over sodium sulfate. The solvent is removed and substantially pure N-(cyclopropylcarbinyloxycarbonyl)-phenylalanine-alanine methyl ester is obtained.

EXAMPLE 3

N-(Cyclopropylmethoxycarbonyl)-Phenylalanine-Alanine Methyl Ester

A. Preparation of Hydroxysuccinimide Ester of N-(Cyclopropylcarbinyloxycarbonyl)-Phenylalanine A sample of 531 mg. (2.02 mM) of N-(cyclopropylmethoxycarbonyl)-phenylalanine and 233 mg. (2.01 mM) of N-hydroxysuccinimide are dissolved in 3.0 ml. of dry peroxide free tetrahydrofuran at 0°–5°C. This solution is treated with 0.48 gm. (2.1 mM) of N,N'-dicyclohexylcarbodiimide and allowed to react at 2°–5°C. Upon completion, the reaction is filtered to remove N,N'-dicyclohexylurea and the solvent removed in vacuo to afford an oily residue which crystallizes upon addition of isopropyl alcohol. The hydroxysuccinimide ester of N-(cyclopropylmethoxycarbonyl)-phenylalanine is isolated by filtration and recrystallized from isopropanol, m.p. 135°–135.5°C.

When in the above procedure 1-hydroxypiperidine and p-nitrophenol are used in place of N-hydroxysuccinimide, there are obtained N-(cyclopropylmethoxycarbonyl) phenylalanine-1-piperidyl ester and N-(cyclopropylmethoxycarbonyl)-phenylalanine-p-nitrophenyl ester, respectively.

B. Preparation of N-(cyclopropylmethoxycarbonyl)-Phenylalanine-Alanine Methyl Ester A solution of 241 mg. (0.67 mM) of hydroxysuccinimide ester of N-(cyclopropylmethoxycarbonyl)-phenylalanine and 120 mg. of alanine methyl ester hydrochloride in 10 ml. of methylene chloride is treated with triethylamine until the pH is adjusted to 7.6–8.0. The reaction is stirred 6 hours and the reaction mixture is washed according to the following procedure: one time with dilute sodium bicarbonate; once with 50% saturated sodium chloride solution; once with 0.2 N sulfuric acid saturated with sodium sulfate; and 2 times with 50% saturated sodium chloride solution. The resulting material is dried over sodium sulfate. The solvent is removed in vacuo to afford N-(cyclopropylmethoxycarbonyl)-phenylalanine-alanine methyl ester which is purified by recrystallizing from a mixture of ethylacetate and hexane.

EXAMPLE 4

N-(Cyclopropylethoxycarbonyl)-Phenylalanine

A. Preparation of 1-Cyclopropylethyl Chloroformate

A solution of 40 mM of phosgene in 20 ml. of benzene is prepared by bubbling the phosgene into the solvent at 0°C. A mixture of 1.5 ml. (1.33 g., 15.5 mM) of 1-methylcyclopropylcarbinyl alcohol and 1.30 ml. (16 mM) of pyridine in 15 ml. of benzene is added over 20 minutes at 0°C. The reaction is allowed to stir for 0.5 hour and the excess phosgene is removed by evacuation with a water aspirator at 0°C. The resulting mixture is filtered and the filtrate reduced in vacuo to a volume of 5 ml. of benzene containing the 1-cyclopropylethyl chloroformate which is employed in the following reaction.

B. N-(1-Cyclopropylethoxycarbonyl)-Phenylalanine

A suspension of 0.60 g. of phenylalanine methyl ester hydrochloride in 15 ml. of chloroform is cooled to 0°C. and the pH adjusted to 8 by addition of triethylamine. A benzene solution of 10 mM of 1-cyclopropylethyl chloroformate is added in portions at 0°C. while maintaining the pH at 8 by addition of triethylamine. Upon completion of the addition, the mixture is stirred for 2 hours and then treated in the following manner: add 20 ml. dilute sodium bicarbonate and washing with 50% saturated sodium chloride solution, 0.1 N sulfuric acid — saturated with sodium sulfate, twice with 50% sodium chloride solution, and drying the resulting solution over sodium sulfate.

Saponification of N-(1-cyclopropylethoxycarbonyl)-phenylalanine methyl ester is accomplished by dissolving the product prepared above in 20 ml. of methanol, adding 20 ml. of water, adjusting the pH to 11 with 1 N sodium hydroxide and allowing the mixture to stir for 46 hours. Thin layer chromatography indicates disappearance of the starting ester. The pH of the mixture is adjusted to 6–7 by addition of 2 N sulfuric acid and the solvent removed in vacuo. Addition of 2.5 N hydrochloric acid precipitates a solid material which is filtered from the acidic solution (pH 1–2). A tacky solid is obtained after washing with water and drying in vacuo. Purification of the crude material is accomplished on a silica gel column using a system of 85-15-2-1 (chloroform-methanol-water-acetic acid), 7 ml. fractions are collected and fractions 10–13 are combined and evaporated in vacuo. The residue is treated with saturated sodium bicarbonate and ether. The aqueous layer is washed with ether; the ether layers combined and washed with two portions of water. Acidification to pH 2 affords an oil which is extracted into chloroform, washed with 50% aqueous sodium chloride, extracted with chloroform, and dried over sodium sulfate. The chloroform is removed in vacuo and addition of ether followed by addition of hexane until the cloud point affords 214 mg. of N-(1-cyclopropylethoxycarbonyl)-phenylalanine.

When in the above procedure glycine methyl ester hydrochloride, alanine methyl ester hydrochloride, valine methyl ester hydrochloride, leucine methyl ester hydrochloride, isoleucine methyl ester hydrochloride, methionine methyl ester hydrochloride, serine methyl ester hydrochloride, proline methyl ester hydrocloride, and tyrosine methyl ester hydrochloride are used in place of phenylalanine methyl ester hydrochloride, there are obtained N-(1-cyclopropylethoxycarbonyl)-glycine, N-(1-cyclopropylethoxycarbonyl)-valine, N-(1-cyclopropylethoxycarbonyl)-leucine, N-(1-cyclopropylethoxycarbonyl)-isoleucine, N-(1-cyclopropylethoxycarbonyl)-methionine, N-(1-cyclopropylethoxycarbonyl)-serine, N-(1-cyclopropylethoxycarbonyl)-proline, and N-(1-cyclopropylethoxycarbonyl)-tyrosine, respectively.

EXAMPLE 5

N-(1-Cyclopropylethoxycarbonyl)-Phenylalanine-Alanine Methyl Ester

To a solution of 0.52 mM of N-(1-cyclopropylethoxycarbonyl phenylalanine in 4 ml. acetonitrile is added 0.60 mM alanine methyl ester hydrochloride and 80 microliters of triethylamine. Immediately following addition of the triethylamine, a solution of 0.58 mM of N,N'-dicyclohexylcarbodiimide in 2 ml. of acetonitrile is added and the reaction is allowed to stir overnight at 20°–25°C. Excess N,N'-dicyclohexylcarbodiimide is destroyed by addition of 5 drops of 50% acetic acid. After adding 15 ml. of methylene chloride, the reaction mixture is filtered to remove the dicyclohexylurea formed during the reaction and the filtrate is treated in the following manner: wash with saturated sodium bicarbonate, 50% saturated sodium chloride solution, 0.2 N sulfuric acid saturated with sodium sulfate, twice with 50% saturated sodium chloride solution. Repeat washing cycle with two portions of methylene chloride and dry over sodium sulfate. The solvent is removed and N-(1-cyclopropylethoxycarbonyl)-phenylalanine-alanine methyl ester is obtained.

EXAMPLE 6

N-(1-Cyclopropylethoxycarbonyl)-Phenylalanine-Alanine Methyl Ester

A. Preparation of Hydroxysuccinimide Ester of N-(1-Cyclopropylethoxycarbonyl)-Phenylalanine A sample of 2.02 mM of N-(1-cyclopropylethoxycarbonyl)-phenylalanine and 2.01 mM of N-hydroxysuccinimide are dissolved in 3.0 ml. of dry peroxide-free tetra-hydrofuran at 0°–5°C. This solution is treated with 2.1 mM of N,N'-dicyclohexylcarbodiimide and allowed to react at 2°–5°C. Upon completion, the reaction is filtered to remove N,N'-dicyclohexylurea and the solvent removed in vacuo to afford the hydroxysuccinimide ester of N-(1-cyclopropylethoxycarbonyl)-phenylalanine.

When in the above procedure 1-hydroxypiperidine and p-nitrophenol are used in place of N-hydroxysuccinimide, there are obtained N-(1-cyclopropylethoxycarbonyl)-phenylalanine-1-piperidyl ester and N-(1-cyclopropylethoxycarbonyl)-phenylalanine-p-nitrophenyl ester, respectively.

B. N-(1-Cyclopropylethoxycarbonyl)-Phenylalanine-Alanine Methyl Ester

A solution of 0.67 mM of the hydroxysuccinimide ester of N-(1-cyclopropylethoxycarbonyl)-phenylalanine and 0.70 mM of alanine methyl ester hydrochloride in 10 ml. of methylene chloride is treated with triethylamine until the pH is adjusted to 7.6–8.0. Reaction is stirred 6 hours and the reaction mixture is washed according to the following procedure: one time with dilute sodium bicarbonate solution, once with 50% saturated sodium chloride solution; once with 0.2 N sulfuric acid saturated with sodium sulfate; and two times with 50% saturated sodium chloride solution. The resulting material is dried over sodium sulfate and the washing procedure repeated. The solvent is removed in vacuo to afford N-(1-cyclopropylethoxycarbonyl)-phenylalanine-alanine methyl ester.

EXAMPLE 7

Aspartyl-Phenylalanine Methyl Ester

A. Preparation of N-(1-Cyclopropylethoxycarbonyl) Aspartic Acid

A suspension of 0.985 g. (0.05 moles) of aspartic acid dimethyl ester hydrochloride in 50 ml. of chloroform is cooled to 0°C. and the pH adjusted to 8 by addition of triethylamine. 1-Cyclopropylethyl chloroformate 1.49 g. (0.10 moles) prepared according to the procedure of Example 1 is added portion-wise at 0°C. and the pH of the reaction is maintained at 8 by addition of triethylamine. Upon completion of the addition, the reaction is stirred ovenight at 20°–25°C. The reaction solution is washed successively with 10 ml. portions of a saturated sodium bicarbonate solution, 50% saturated solution of sodium chloride, 0.2 N sulfuric acid saturated with sodium sulfate, 50% saturated solution of sodium chloride (twice), and the chloroform solution is dried over sodium acetate. Removal of the chloroform affords N-(1-cyclopropylethoxycarbonyl) aspartic acid dimethyl ester. Saponification is accomplished by dissolving the ester in 50 ml. of methanol, water 50 ml. is added, and the pH is adjusted to 12 by addition of 2 N sodium hydroxide. After stirring overnight at 25°C., the pH is adjusted to 7 with 2 N sulfuric acid. The methanol is removed in vacuo and saturated sodium bicarbonate solution is added to the water solution. The aqueous bicarbonate solution is washed two times with ether and then the pH is adjusted to 3 by addition of concentrated hydrochloric acid. The acidified solution is extracted 3 times with ethyl acetate and the organic extracts combined, washed twice with sodium chloride solution and dried over sodium sulfate. The solvent is removed in vacuo to afford N-(1-cyclopropylethoxycarbonyl) aspartic acid.

B. Preparation of N-(1-Cyclopropylethoxycarbonyl) Aspartic Anhydride

A solution of 2.45 g. of N-(1-cyclopropylethoxycarbonyl) aspartic acid in 50 ml. of dioxane is prepared and 2.2 g. of dicyclohexylcarbodiimide is added with vigorous stirring. After stirring at 25°C. for 2 hours, the dicyclohexylurea is removed by filtration and the dioxane removed by evaporation in vacuo. The resulting solid is substantially pure N-(1-cyclopropylethoxycarbonyl) aspartic anhydride.

C. Preparation of N-(1-Cyclopropylethoxycarbonyl)-Aspartyl-Phenylalanine Methyl Ester About 2.27 g. of N-(1-cyclopropylethoxycarbonyl) aspartic anhydride, 2.15 g. of phenylalanine metyl ester hydrochloride, and 0.95 g. of triethylamine are dissolved in about 50 ml. of dimethylformamide and the resulting solution stirred at 20°C. for 4 hours. The solution is evaporated to dryness and dissolved in about 150 ml. of ethyl acetate. The ethyl acetate solution is extracted with 2 × 150 ml. of 1 N sulfuric acid, dried over sodium sulfate, and evaporated to dryness in vacuo to give a mixture of α and β N-(1-cyclopropylethoxycarbonyl)-aspartyl-phenylalanine methyl ester.

D. Aspartyl-Phenylalanine Methyl Ester

A mixture of α and β N-(1-cyclopropylethoxycarbonyl) aspartyl-phenylalanine methyl ester (1 g.) is dissolved in 16 ml. of anhydrous hydrofluoric acid at 0°C. with stirring. After stirring for 45 minutes at 0°C., the solution is evaporated to dryness under a stream of nitrogen. The resulting solid mixture of α and β aspartyl phenylalanine methyl ester is dissolved in water and the pH adjusted to 3–5 with sodium hydroxide. The α-isomer is precipitated by the addition of an organic acid such as β-phenyl propionic acid and isolated by filtration.

When in Step A of the above procedure cyclopropylcarbinyl chloroformate is used in place of 1-cyclopropylethoxy chloroformate, N-(cyclopropylmethoxycarbonyl) aspartic acid is obtained. The compound is converted to aspartyl-phenylalanine methyl ester according to the procedures of Steps B, C, and D.

Various changes and modifications in the procedures herein disclosed will occur to those skilled in the art, and to the extent that such changes and modifications are embraced by the appended claims, it is to be understood that they constitute part of our invention.

What is claimed is:

1. A compound selected from the group consisting of N-(cyclopropylmethoxycarbonyl) and N-(1-cyclopropylethoxycarbonyl) derivatives of the α-amino grouping of glycine, alanine, valine, leucine, isoleucine, phenylalanine, tyrosine, serine, threonine, aspartic acid, glutamic acid, arginine, lysine, and ornithine; and lower alkyl, benzyl, phenylethyl, phenyl and p-nitrophenyl esters thereof.

2. N-(cyclopropylmethoxycarbonyl)-phenylalanine.

3. N-(1-cyclopropylethoxycarbonyl)-phenylalanine.

* * * * *